(12) United States Patent
Gleizer

(10) Patent No.: US 11,354,734 B2
(45) Date of Patent: Jun. 7, 2022

(54) CRYPTOGRAPHIC MONETARY SYSTEM FOR PROVIDING DIGITAL CURRENCY

(71) Applicant: Henry Gleizer, New York, NY (US)

(72) Inventor: Henry Gleizer, New York, NY (US)

(*) Notice: Subject to any disclaimer, the term of this patent is extended or adjusted under 35 U.S.C. 154(b) by 388 days.

(21) Appl. No.: 16/657,091

(22) Filed: Oct. 18, 2019

(65) Prior Publication Data
US 2020/0184555 A1    Jun. 11, 2020

Related U.S. Application Data

(60) Provisional application No. 62/777,348, filed on Dec. 10, 2018.

(51) Int. Cl.
| | | |
|---|---|---|
| *G06Q 40/02* | (2012.01) | |
| *H04L 9/14* | (2006.01) | |
| *G06Q 40/00* | (2012.01) | |

(52) U.S. Cl.
CPC ........... *G06Q 40/025* (2013.01); *G06Q 40/12* (2013.12); *H04L 9/14* (2013.01); *H04L 2209/56* (2013.01)

(58) Field of Classification Search
None
See application file for complete search history.

(56) References Cited

U.S. PATENT DOCUMENTS

| | | | |
|---|---|---|---|
| 10,108,954 B2 | 10/2018 | Dunlevy | |
| 10,373,129 B1 | 8/2019 | Halley | |
| 10,373,158 B1 | 8/2019 | Halley | |
| 10,438,290 B1 | 10/2019 | Winklevoss | |
| 11,074,648 B1 * | 7/2021 | Duccini | H04L 63/123 |

(Continued)

FOREIGN PATENT DOCUMENTS

| | | | |
|---|---|---|---|
| CA | 3023325 A1 | 5/2019 | |
| WO | 2018175504 A1 | 9/2018 | |

(Continued)

OTHER PUBLICATIONS

Author Unknown, "Blockchain", "Wikipedia", date of publication unknown but believed to be after the filing date of the present application, found on https://en.wikipedia.org/wiki/Blockchain and printed on Dec. 13, 2019.

(Continued)

*Primary Examiner* — Scott A Zare

(57) ABSTRACT

System (100) operable to store loan ledger (700) operable to store data records in blockchain (600), and available balance (111) of an asset-backed digital currency. The data records comprising loan records (210) and loan payments records (220). The system further comprises processor (302) communicatively coupled to memory (304). Processor (302) may receive a request corresponding to loan record (210), requesting to store loan record (210) in loan ledger (700), and increment available balance (111) by loan's (210) principal amount (212). Processor (302) may also receive a payment request comprising loan payment record (220) associated with loan record (210), requesting to store loan payment record (220) in loan ledger (700), and decrement available balance (111) by a portion of payment amount (221) corresponding to loan principal payment (222). Whereby, system (100) provides the asset-backed digital currency having value comprising total value of loans (210) stored in loan ledger (700).

11 Claims, 10 Drawing Sheets

(56) References Cited

U.S. PATENT DOCUMENTS

| | | | |
|---|---|---|---|
| 2016/0371771 A1 | 12/2016 | Serrano | |
| 2017/0024813 A1 | 1/2017 | Crouspeyre | |
| 2018/0075421 A1 | 3/2018 | Serrano | |
| 2018/0268504 A1 | 9/2018 | Paolini-Subramanya | |
| 2019/0012663 A1 | 1/2019 | Masters | |
| 2019/0026730 A1 | 1/2019 | Moy | |
| 2019/0044700 A1 | 2/2019 | Leddy | |
| 2019/0102839 A1 | 4/2019 | Kim | |
| 2019/0114706 A1* | 4/2019 | Bell | H04L 9/0825 |
| 2019/0172130 A1 | 6/2019 | Gurin | |
| 2019/0228409 A1 | 7/2019 | Madisetti | |
| 2019/0228468 A1 | 7/2019 | Hu | |
| 2019/0236564 A1 | 8/2019 | Cantrell | |
| 2019/0296916 A1 | 9/2019 | Qiu | |
| 2019/0303926 A1 | 10/2019 | Yantis | |
| 2019/0333142 A1 | 10/2019 | Apsel | |
| 2020/0042989 A1* | 2/2020 | Ramadoss | G06Q 20/3823 |
| 2020/0143466 A1* | 5/2020 | Wu | H04L 9/3239 |
| 2020/0151709 A1* | 5/2020 | Bryan | G06Q 40/08 |
| 2021/0224759 A1* | 7/2021 | Zorzano Blasco | G06Q 20/3676 |

FOREIGN PATENT DOCUMENTS

| | | |
|---|---|---|
| WO | 2019079510 A1 | 10/2018 |
| WO | 2019137284 A1 | 1/2019 |
| WO | 2019104250 A1 | 5/2019 |
| WO | 2019122977 A1 | 6/2019 |
| WO | 2019169374 A1 | 9/2019 |

OTHER PUBLICATIONS

Author Unknown, "Cryptocurrency", "Wikipedia", date of publication unknown but believed to be after the filing date of the present application, found on https://en.wikipedia.org/wiki/Cryptocurrency and printed on Dec. 13, 2019.

Author Unknown, "Currency", "Wikipedia", date of publication unknown but believed to be after the filing date of the present application, found on https://en.wikipedia.org/wiki/Currency and printed on Dec. 13, 2019.

Author Unknown, "The Chicago Plan Revisited", "Wikipedia", date of publication unknown but believed to be after the filing date of the present application, found on https://en.wikipedia.org/wiki/The_Chicago_Plan Revisited and printed on Dec. 13, 2019.

Author Unknown, "Stablecoin", "Wikipedia", date of publication unknown but believed to be after the filing date of the present application, found on https://en.wikipedia.org/wiki/Stablecoin and printed on Dec. 13, 2019.

Author Unknown, "Money supply", "Wikipedia", date of publication unknown but believed to be after the filing date of the present application, found on https://en.wikipedia.org/wiki/Money_supply and printed on Dec. 13, 2019.

Author Unknown, "Monetary system", "Wikipedia", date of publication unknown but believed to be after the filing date ot the present application, found on https://en.wikipedia.org/wiki/Monetary_system and printed on Dec. 13, 2019.

Author Unknown, "Monetary policy", "Wikipedia", date of publication unknown but believed to be after the filing date of the present application, found on https://en.wikipedia.org/wiki/Monetary_policy and printed on Dec. 13, 2019.

Author Unknown, "Monetarism", "Wikipedia", date of publication unknown but believed to be after the filing date of the present application, found on https://en.wikipedia.org/wiki/Monetarism and printed on Dec. 13, 2019.

Author Unknown, "Modem Monetary Theory", "Wikipedia", date of publication unknown but believed to be after the filing date of the present application, found on https://en.wikipedia.org/wiki/Modern_Monetary_Theory and printed on Dec. 13, 2019.

Author Unknown, "Medium of exchange", "Wikipedia", date of publication unknown but believed to be after the filing date of the present application, found on https://en.wikipedia.org/wiki/Medium_of_exchange and printed on Dec. 13, 2019.

* cited by examiner

CRYPTOGRAPHIC MONETARY SYSTEM FOR PROVIDING DIGITAL CURRENCY

CROSS-REFERENCE TO RELATED APPLICATIONS

This application claims the benefit of U.S. Provisional Application Ser. No. 62/777,348, filed on Dec. 10, 2018, all of which is incorporated herein by reference in its entirety.

FEDERALLY SPONSORED RESEARCH

Not Applicable

SEQUENCE LISTING OR PROGRAM

Not Applicable

BACKGROUND—FIELD

This application relates to a monetary system, specifically to a blockchain based monetary system for providing a supply of asset-backed digital currency.

BACKGROUND—PRIOR ART

A monetary system is a set of systems and methods for providing a supply of money. Wherein, money is any item or verifiable record (e.g., electronic data) that is generally accepted as payment for goods and services and repayment of debts. A monetary system usually consists of a mint, central bank, and commercial banks.

A cryptocurrency (crypto currency) is currency (digital currency, virtual currency, money, electronic money, monetary unit) when in use as a medium of exchange, created and stored electronically in a blockchain, using cryptography to control the creation of additional monetary units (i.e., standard units of money such as the dollar in the United States) and to verify the transfer of funds. And a publicly distributed ledger implementation adds means for decentralizing blockchain operations.

A cryptocurrency uses strong cryptography to secure the creation of additional units. The validity of each unit of cryptocurrency is provided by a blockchain. A blockchain (blockchain ledger, digital ledger) is a continuously growing list of records, called blocks, which are linked and secured using cryptography. Each block typically contains a cryptographic signature (a hash or a digital signature produced by a mathematical algorithm that maps data of arbitrary size to a bit string of a fixed size and is designed to be a one-way function, e.g., SHA-256) of the previous block known as a hash pointer, a timestamp and a data record. By design, blockchains are inherently resistant to modification of the data.

In some embodiments of prior art, a blockchain is used to implement a publicly distributed ledger that can record transactions between two parties in a substantially verifiable way. For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority. A distributed ledger is an example of a distributed computing system that solves the double spending problem without the need of a trusted authority or a central server.

The average time it takes for this network to add a new block to the blockchain is referred to as a block time. By the time of block completion, the included data becomes verifiable. This is practically when the money transaction takes place, so a shorter block time means faster transactions.

In the case of a Bitcoin implementation, to add a new entry to its distributed ledger (i.e., a blockchain) requires agreement of the majority of the network participants, with cryptography used as means for validating integrity of data in the blockchain (e.g., a proof of work). And even though it is considered difficult to temper with such a public blockchain, it is not impossible.

Blockchain security methods include the use of public-key cryptography. Two of the best-known uses of public key cryptography are public key encryption and cryptographic signatures (a cryptographic hash, a digital signature, or a digital fingerprint). In public key encryption, a message is encrypted with a recipient's public key. The message cannot be decrypted by anyone who does not possess the matching private key, who is thus presumed to be the owner of that key and the person associated with the public key. This is used in an attempt to ensure confidentiality. In cryptographic signatures, a message is signed with the sender's private key and can be verified by anyone who has access to the sender's public key. This verification proves that the sender had access to the private key, and therefore is likely to be the person associated with the public key. This also ensures that the message has not been tampered with, as a signature is mathematically bound to the message it originally was made with, and verification will fail for practically any other message, no matter how similar to the original message.

Cryptocurrencies like Bitcoin are properties that have no value other than their function as money. Much of their value is attributed to their limited quantity and resistance to counterfeiting. As such they have indeterminate value resulting in extreme volatility that is further compounded by swings in demand on their limited supply. This makes them unusable for business transactions, which is the primary function of money. Most cryptocurrencies also charge a transaction fee that has several negative effects including reduction of the intrinsic value and reduction of the velocity of money.

One of the main advantages of the existing cryptocurrencies being claimed is that they are decentralized. The proponents claim that because the currency is decentralized, you own it. No central authority has control, and so no one can take it away from you. However a decentralized model creates significant problems including low level of privacy, vulnerability to crime, legal uncertainties, and very slow and expensive transactions. But the main problem with the decentralized model is that there is no one to help when problems arise. This has become evident in light of enormous losses due to theft and fraud.

Cryptocurrencies have been compared to Ponzi schemes, pyramid schemes and economic bubbles, such as housing market bubbles. Howard Marks of Oaktree Capital Management stated in 2017 that digital currencies were "nothing but an unfounded fad (or perhaps even a pyramid scheme), based on a willingness to ascribe value to something that has little or none beyond what people will pay for it", and compared them to the tulip mania (1637), South Sea Bubble (1720), and dot-com bubble (1999).

Stablecoins are cryptocurrencies designed to minimize the volatility of the price of the stablecoin, relative to some "stable" asset or basket of assets. A stablecoin can be pegged to a cryptocurrency, fiat money, or to exchange-traded commodities (such as precious metals or industrial metals).

Stablecoins redeemable in currency, commodities, or fiat money are said to be backed, whereas those tied to an algorithm are referred to as seigniorage-style (not backed).

Stablecoins can be prone to failure as well due to volatility and upkeep required in many cases. NuBits is one example of a stablecoin which has failed to maintain its peg. The stablecoin project Basis, which had received over $100 million in venture capital funding, shut down in December 2018, citing concerns about US regulation. Tether, the largest stablecoin by market capitalization, has faced accusations of being unable to provide audits for their reserves while continually printing millions.

BACKGROUND—ADVANTAGES

Several objects and advantages of the cryptographic monetary system (monetary system or system) address deficiencies found in prior art cryptocurrencies, including lack of identifiable intrinsic value, extreme volatility, and unsuitability for business operations. The preferred embodiments provide a cryptographic monetary system having the following objects and advantages including: (a) the system provides the available balance of the asset-backed digital currency (i.e., currency backed by assets) as monetary units, (b) the system provides the available balance of the asset-backed digital currency having value comprising total value of loans (denominated in the asset-backed digital currency) stored in the loan ledger, (c) the system provides the asset-backed digital currency having a substantially stable value, (d) the system enables to substantially verify that the available balance of the asset-backed digital currency is substantially equals the sum of the principal amount (i.e., the original sum of money borrowed in a loan) of each loan stored in the loan ledger minus sum of the loan principal payments of each loan payment stored in the loan ledger (i.e., outstanding value of loans stored in the loan ledger), wherein data stored in the loan ledger could be validated using the public key.

Since the system provides the available balance of the asset-backed digital currency having value comprising the total value of loans stored in the loan ledger, the supply of the monetary units will be able to expand and contract while maintaining the value of the monetary units. Additionally, the system enables to substantially verify, using the blockchain technology, that the available balance of the asset-backed digital currency is substantially equal to (i.e., backed by) the outstanding value of loans stored in the loan ledger. Whereby the cryptographic monetary system provides the asset-backed digital currency having a substantially stable value. Additionally, the cryptographic monetary system provides a substantially stable monetary system, i.e., a stable methods for providing a supply of money. Moreover, unlike other asset-backed currencies, like commodity based currencies, the supply of the asset-backed digital currency is mostly limited by demand for it, i.e., loans of the asset-backed digital currency.

Furthermore, because the asset-backed digital currency is backed by the intrinsic value of borrowers' efforts to pay off their loans. That is, the asset-backed digital currency would be directly backed by the intrinsic value of work that represents the real value, rather than a by-product of work, such as gold. Since borrowers' efforts to pay off their loans are a stable commodity, the intrinsic value of the asset-backed digital currency should be stable. And unlike commodity-backed cryptocurrencies that mostly have a fractional reserve value, the asset-backed digital currency would be fully backed by the full faith and credit of the borrowers.

To enable the use of the asset-backed digital currency as money, a currency exchange or an alternative trading system could be used to facilitate conversion of the asset-backed digital currency into fiat currencies such as the US dollar, yuan, yen, etc. This process may be further facilitated by the use of various payment methods (e.g., mobile payments, payment cards, electronic wallets, etc.) to enable the asset-backed digital currency to be used seamlessly, just like any other currency.

The asset-backed digital currency is a variation on a cryptocurrency. As such, it is a digital security designed to work as a medium of exchange that uses cryptography to control the creation of additional monetary units, and to secure the transfer of assets. In addition, the cryptographic monetary system may be able to provide to its users interest payments, privacy, transparency, secure ownership, free real-time transactions, international borderless transferability and convertibility, a variety of payment methods, free basic account services, and a legal framework. The asset-backed digital currency could be issued as a Registered Security under the SEC regulations with all the advantages that implies. Given its many advantages, the cryptographic monetary system may offer substantial protection from the problems associated with other cryptocurrencies and the legacy banking system.

The various aspects of the cryptographic monetary system may be more clearly understood and appreciated from a review of the following detailed description of the disclosed embodiments and by reference to the appended drawings and claims.

SUMMARY

In accordance with one embodiment a cryptographic monetary system employs blockchain technology to secure issuance and maintenance of loans denominated in asset-backed digital currency, whereby providing a verifiable outstanding loan balance of asset-backed digital currency for use as monetary units.

DRAWINGS

For a more complete understanding of the present disclosure and its advantages, reference is made to the following descriptions, taken in conjunction with the accompanying drawings in which.

DETAILED DESCRIPTION—FIG. 1, 1A, 2-10

Embodiments of the cryptographic monetary system will now be described more fully hereinafter with reference to the accompanying drawings, in which some, but not all, embodiments are shown. Indeed, the cryptographic monetary system may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form, and vice versa, unless explicitly stated otherwise.

Figure 1:
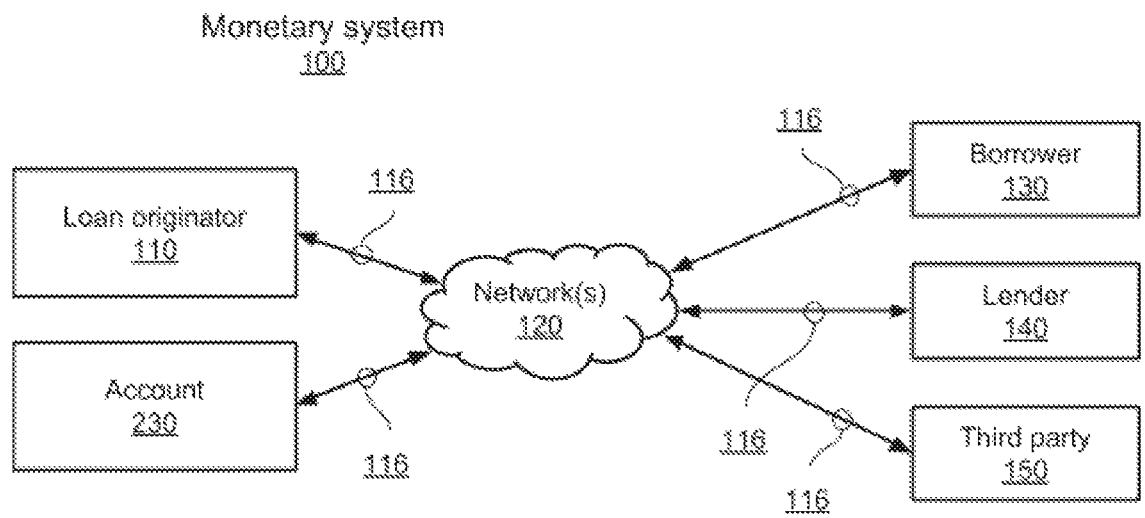
FIG. 1 illustrates an example cryptographic monetary system.

FIG. 1 illustrates an example cryptographic monetary system (monetary system or system) 100. Wherein, components of system 100 are implemented using any suitable number of computer systems 300. In some embodiments, components of system 100 may be configured to communicate over links 116. Communication over links 116 may request and/or send information to any suitable component of system 100. Links 116 may connect components of system 100 to network 120 or to each other. In particular, loan originator 110 computer system may communicate via link 116 over network 120 with other components (i.e., computer systems) including borrower 130, lender 140, and third party 150.

This disclosure contemplates any suitable links 116 operable over network(s) 120. In particular embodiments, one or more links 116 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 116 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 116, or a combination of two or more such links 116. In particular embodiments, one or more links 116 may utilize interprocess communication (IPC) that refers to mechanisms an operating system provides to allow processes to manage shared resources. Depending on the solution, an IPC mechanism may provide synchronization or leave it up to processes and threads to communicate amongst themselves (e.g. via shared memory serving as network(s) 120). Typically, applications can use IPC, categorized as clients and servers, where the client requests data and the server responds to client requests. Many applications are both clients and servers, as commonly seen in distributed computing. Links 116 need not necessarily be the same throughout system 100. One or more first links 116 may differ in one or more respects from one or more second links 116. System 100 is illustrated above as an example and not by way of limitation.

Figure 1A:
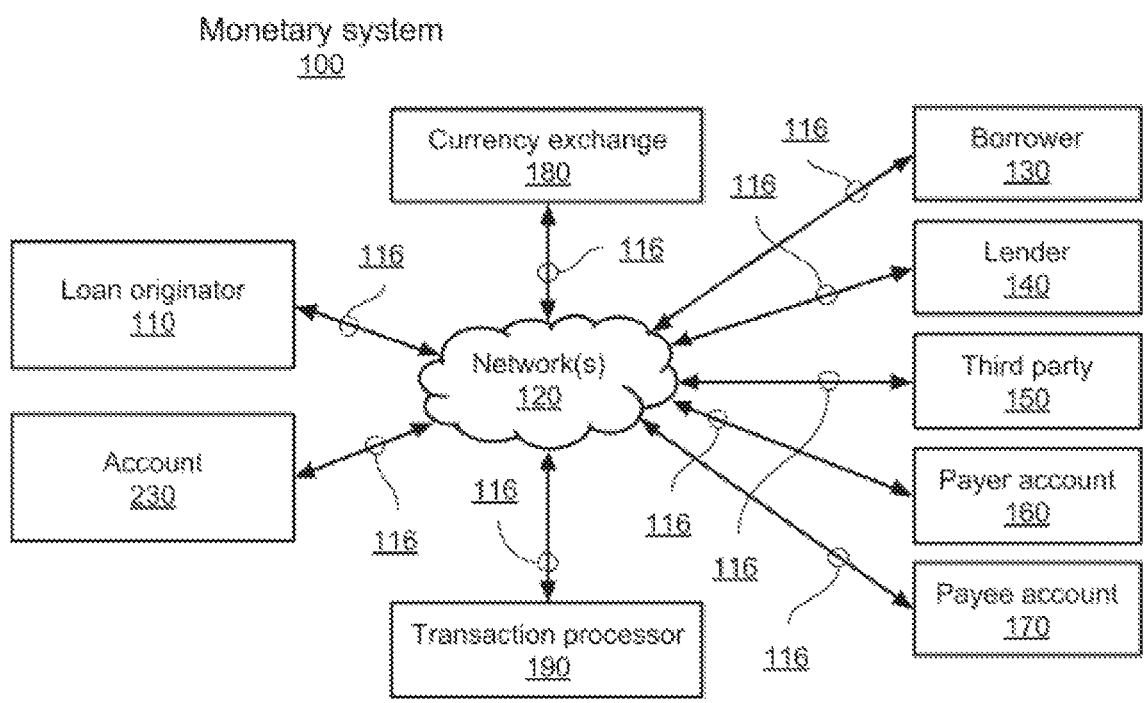
FIG. 1A illustrates a substantially more complete example cryptographic monetary system.

FIG. 1A illustrates a substantially identical to cryptographic monetary system 100 shown in FIG. 1 with additional elements including: payer account 160, payee account 170, currency exchange 180, and transaction processor (or payment processor) 190. Wherein payer account 160 and payee account 170 is enabled to make and/or receive payments in the asset-backed digital currency. In particular embodiments, transaction processor 190 enables transfer of funds from payer account 160 to payee account 170. Wherein, transaction processor 190 is further enabled by currency exchange 180 to convert funds being transferred from payer account 160 in to currency acceptable to payee account 170. Wherein, currency exchange 180 enables conversion (via trade) of the asset-backed digital currency to fiat currencies such as USD, Euro, Yen, etc. Whereby, system 100 enables payer account 160 to make payments to payee account 170 in the asset-backed digital currency and/or fiat currencies. System 100 is illustrated above as an example and not by way of limitation.

Figure 2:
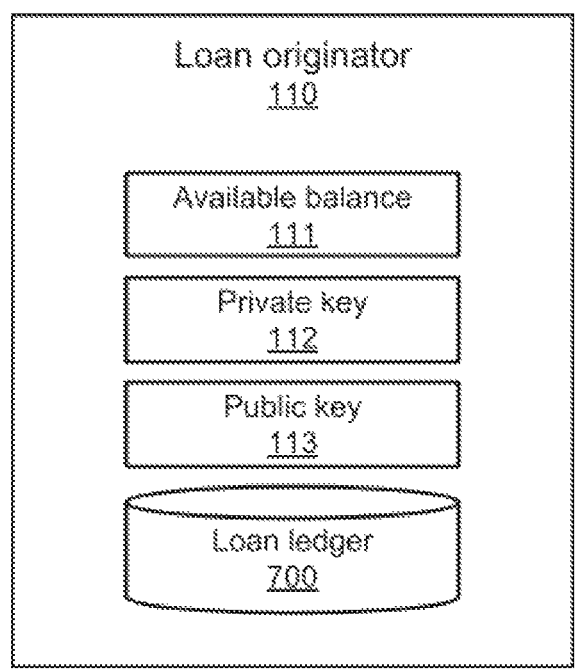
FIG. 2 illustrates an example loan originator.

FIG. 2 illustrates an example loan originator 110. In particular embodiments, loan originator 110 comprising available balance 111, private key 112, public key 113, and loan ledger 700. Wherein, available balance 111 corresponds to the total amount of the asset-backed digital currency issued for the loans (i.e., total loan principle) recorded in loan ledger 700. In particular embodiments, loan ledger 700 stores data in at least one blockchain using private key 112 and stored data is verified using public key 113. System 100 is not limited by any embodiment of loan originator 110, as any other embodiments will find use with system 100.

Figure 3:
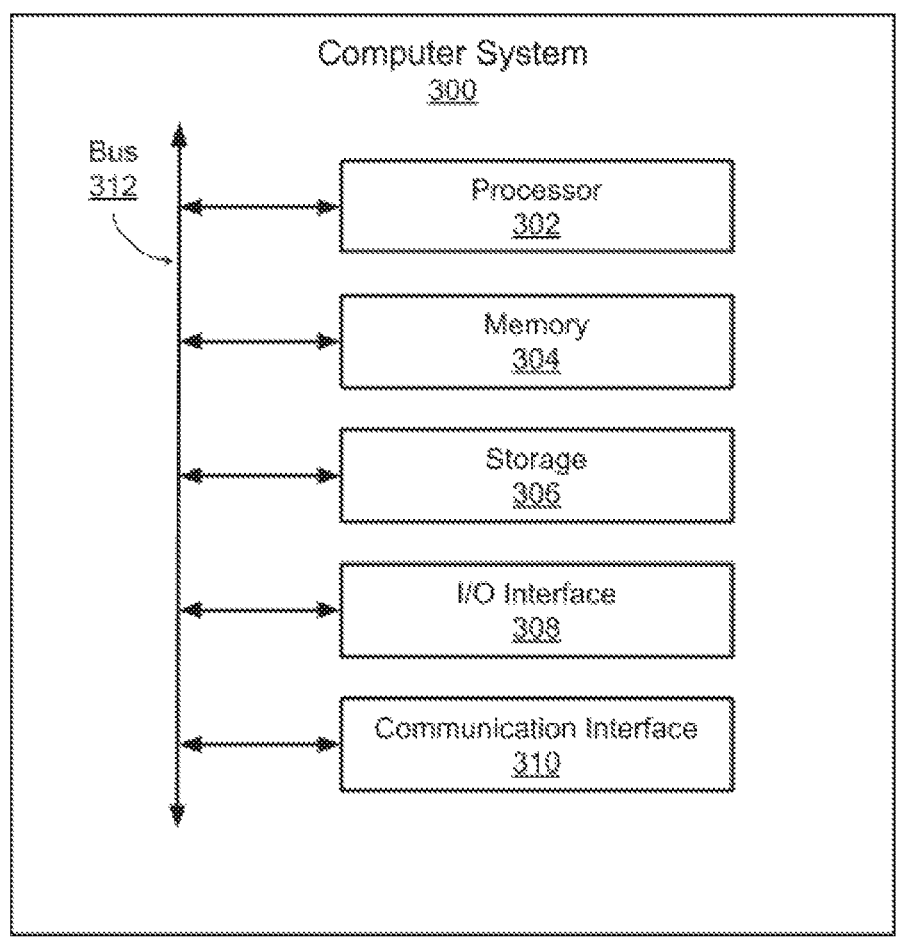
FIG. 3 illustrates an example computer system.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or storing data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate. System 100 is not limited by any embodiment of computer system 300, as any other embodiments will find use with system 100.

Figure 4:
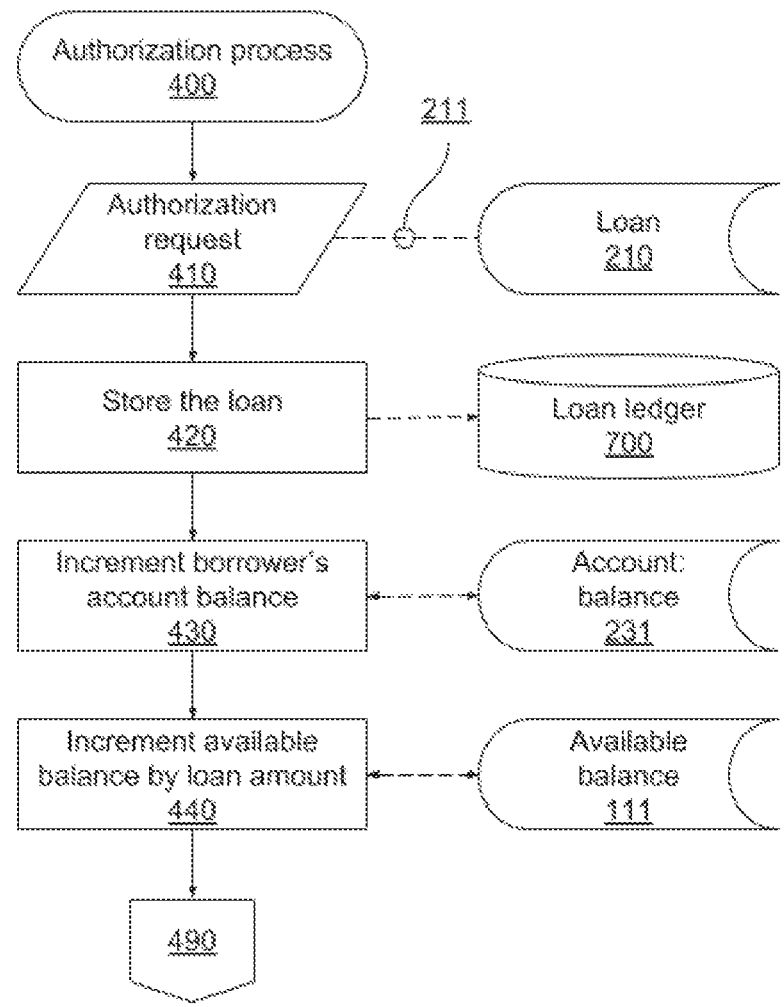
FIG. 4 illustrates a flowchart example authorization process.

FIG. 4 illustrates a flowchart example authorization process 400. In particular embodiments, authorization process 400 is performed by processor 302 communicatively coupled to memory 304, memory 304 including executable instructions that upon execution by processor 302 cause system 100 to: receive authorization request 410 corresponding (e.g., via a loan number 211) to loan record 210, request 410 requesting to: store 420 loan record 210 in loan ledger 700, optionally increment 430 account balance 231 relating to account 230 by an amount comprising principal amount 212; and increment 440 available balance 111 by an amount comprising principal amount 212. System 100 is not limited by any embodiment of authorization process 400, as any other embodiments will find use with system 100.

Figure 5:
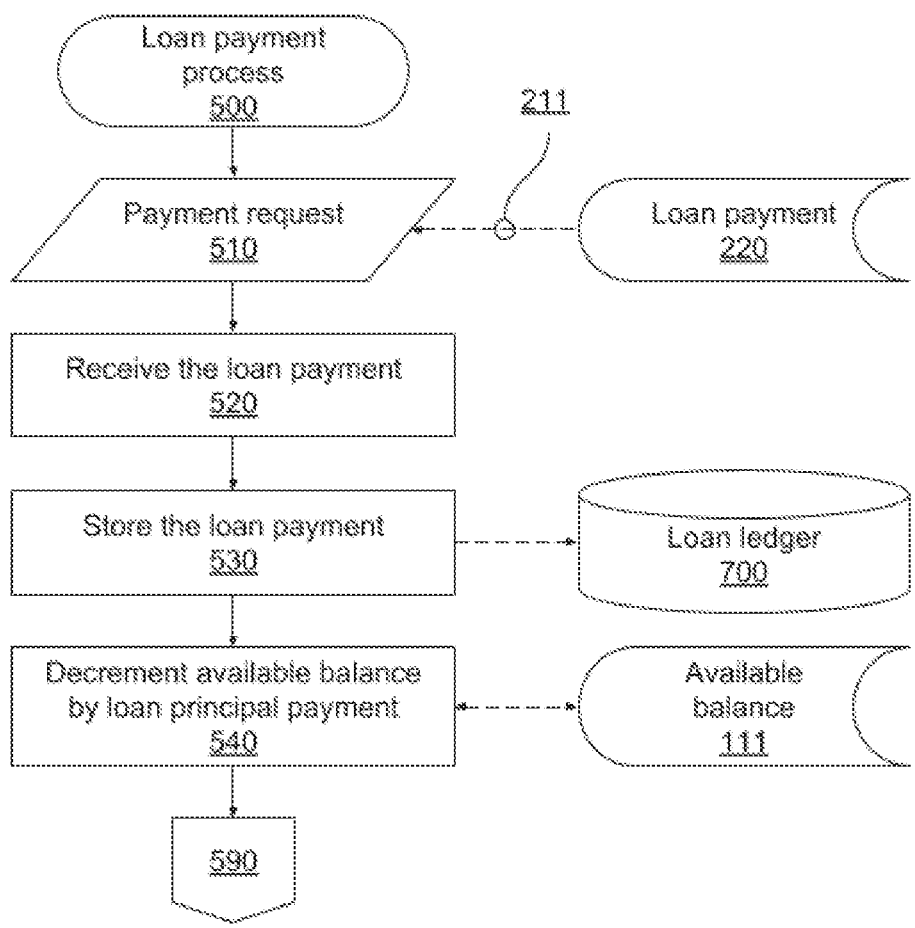
FIG. 5 illustrates a flowchart example loan payment process.

FIG. 5 illustrates a flowchart example loan payment process 500. In particular embodiments, loan payment process 500 is performed by processor 302 communicatively coupled to memory 304, memory 304 including executable instructions that upon execution by processor 302 cause system 100 to: receive a number of payment requests 510 corresponding (e.g., via loan number 211) to the loan payment record 220 associated (e.g., via loan number 211) with loan record 210, request 510 requesting to: receive payment amount 520 corresponding to loan payment record 220; store loan payment record 220 in loan ledger 700, and decrement 540 available balance 111 by a portion of payment amount 221 corresponding to loan principal payment 222. System 100 is not limited by any embodiment of loan payment process 500, as any other embodiments will find use with system 100.

Figure 6:
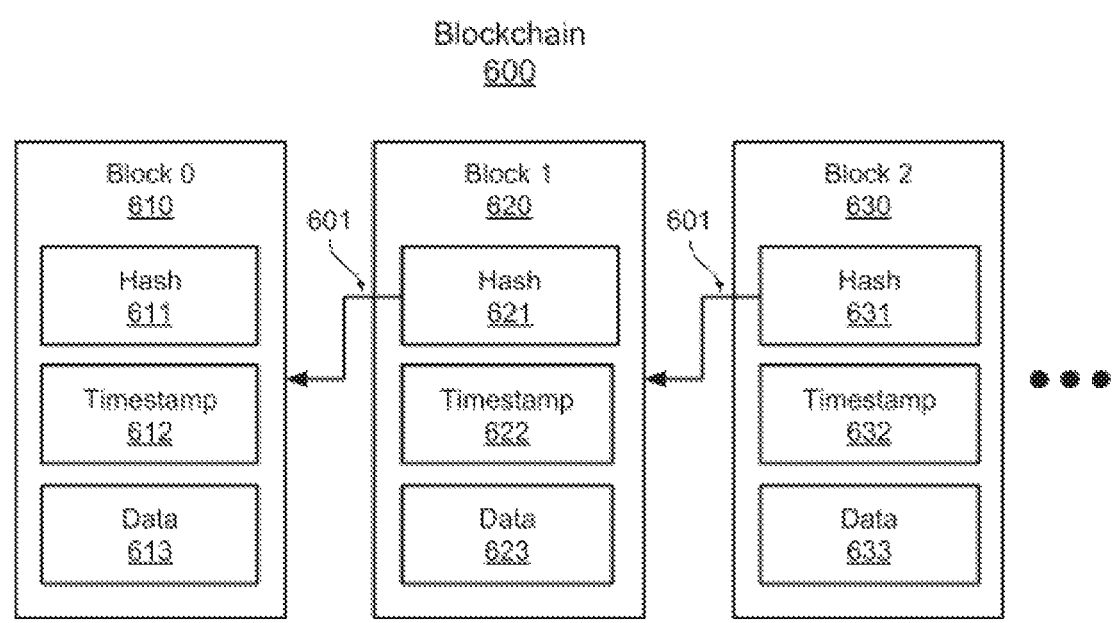
FIG. 6 illustrates an example blockchain.

FIG. 6 illustrates an example blockchain 600. In particular embodiments, blockchain 600 is a continuously growing list of records (a list is an abstract data type that represents a sequence of a countable number of ordered records, where the same record may occur more than once), called blocks (e.g., 610, 620, 630), which are linked and secured using cryptography. Each block typically contains a hash pointer 601 corresponding to a hash (e.g., 611, 621, 631) of the previous block, optional timestamp (e.g., 612, 622, 632), and data (e.g., 613, 623, 633). In some embodiments, first block 610 is called a genesis block of blockchain 600 and is used to utilize blockchain 600. Wherein, genesis block 610 is a special case in that hash 611 does not reference a previous block. In some embodiments, block 620 that follows genesis block 610 is considered to be the first block in blockchain 600 containing relevant data. System 100 is not limited by any embodiment of blockchain 600, as any other embodiments will find use with system 100.

In particular embodiments, hash pointer 601 is a unique identifier for the data that can be used to reference that data (i.e., means of locating data). The hash pointer 601 is derived from a hash (e.g., 611, 621, 631) of that data. Wherein hash (e.g., 611, 621, 631) is a cryptographic signature or a digital signature produced by a mathematical algorithm that uses a cryptographic key (e.g., 112, 113) to maps data of arbitrary size to a bit string of a fixed size and is designed to be a one-way function, (e.g., SHA-256). System 100 is not limited by any embodiment of hash pointer 601, as any other embodiments will find use with system 100.

In particular embodiments, a cryptographic key (or key, e.g., 112, 113) specifies the transformation of plaintext into ciphertext, and vice versa for decryption algorithms. Keys also specify transformations in other cryptographic algorithms including public key encryption and cryptographic signatures (a hash, a digital signature, or a digital fingerprint). In public key encryption, a message (data) is encrypted with a recipient's public key. The message cannot be decrypted by anyone who does not possess the matching private key, who is thus presumed to be the owner of that key and the person associated with the public key. This is used in an attempt to ensure confidentiality. In cryptographic signatures, a message is signed with the sender's private key and can be verified (or validated) by anyone who has access to the sender's public key. This verification proves that the sender had access to the private key, and therefore is likely to be the person associated with the public key. This also ensures that the message has not been tampered with, as a signature is mathematically bound to the message it originally was made with, and verification will fail for practically any other message, no matter how similar to the original message. System 100 is not limited by any embodiments of cryptographic algorithms including public key encryption and cryptographic signatures, as any other embodiments will find use with system 100.

In particular embodiments, blockchain 600 corresponds to a data structure known as a list. In some embodiments, an additional hash of the list itself (also called a top hash, root hash or master hash) is used. A hierarchical data structure of blockchain 600 may include any other data structures besides the list shown, for example, a hash list, a hash tree (e.g., a Merkle tree), etc. System 100 is not limited by any implementation of blockchain 600 or data structures contained therein, as any other embodiments will find use with system 100.

In some embodiments, blockchain 600 is a chain of blocks starting from a genesis block 0 up to the last block in the chain. Each block in the chain refers to its predecessor block via a hash pointer (e.g., hash 621, hash 631, etc.). Since each block in a blockchain contains a hash of data stored in the previous block, the data stored in any given block is substantially resistant to modification without alteration of all subsequent blocks. This feature further provides means for validating (or verifying) integrity of data stored in blockchain 600. Wherein, each block in blockchain 600 must contain hash (e.g., 621, 631, etc.) of the proceeding block. Wherein, hash (e.g., 621, 631, etc.) is verified (or validated) by a cryptographic function using public key 113. Otherwise blockchain 600 is considered not validated. The verification process is a matter of the blockchain's protocol (or rules) for what constitutes a valid data, or a valid creation of a new block in a blockchain. System 100 is not limited by any implementation for verifying integrity of data stored in blockchain 600, as any other embodiments will find use with system 100.

Figure 7:
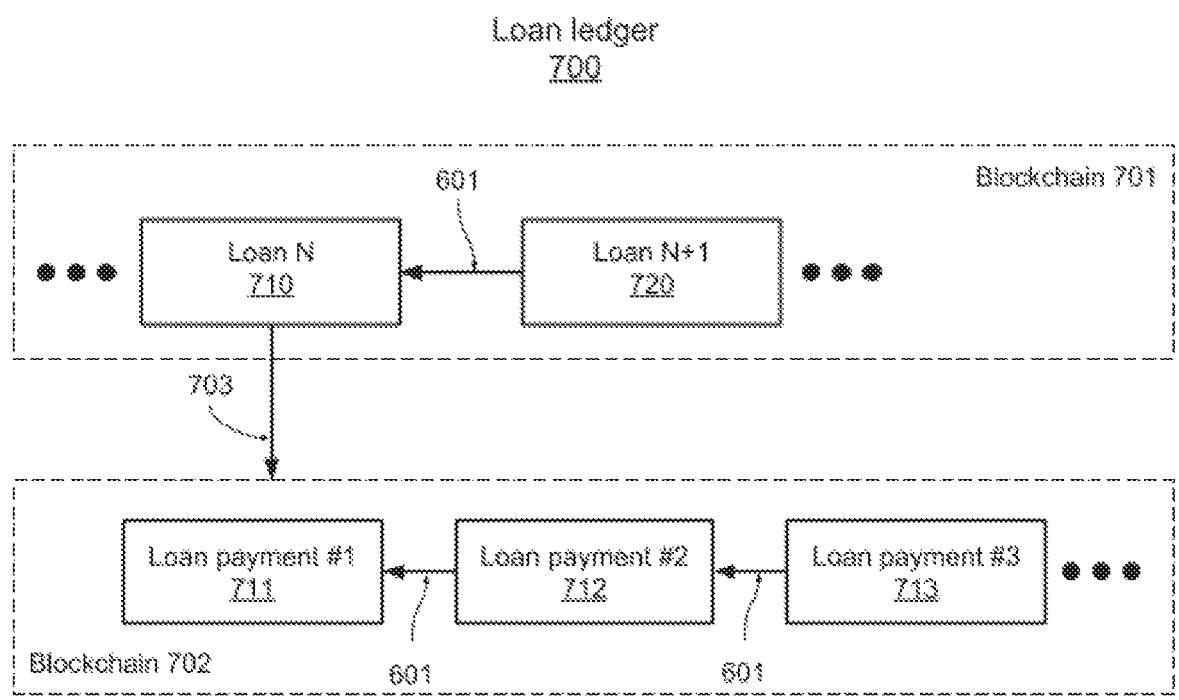
FIG. 7 illustrates an example loan ledger.

FIG. 7 illustrates an example loan ledger 700. In particular embodiments, loan ledger 700 is comprising blockchain 701 comprising a number of loan records (or blocks), e.g., loan N 710 and loan N+1 720, etc. with each loan record, e.g., loan N 710 having a hash pointer 703 referencing a genesis block of blockchain 702 comprising a number of loan payment records (or blocks) related to loan N 710, including loan payment #1 711, loan payment #2 712, loan payment #3 713, etc. In particular embodiments, blocks of blockchain 701 and blockchain 702 are linked by hash pointers 601 and 703. System 100 is not limited by any embodiment (including its architecture and/or data structures) of loan ledger 700, as any other embodiments will find use with system 100.

In particular embodiments, content of loan ledger 700 is verifiable by substantially identical means used to verify blockchain 600. System 100 is not limited by any implementation for verifying integrity of data stored in loan ledger 700, as any other embodiments will find use with system 100.

Figure 8:
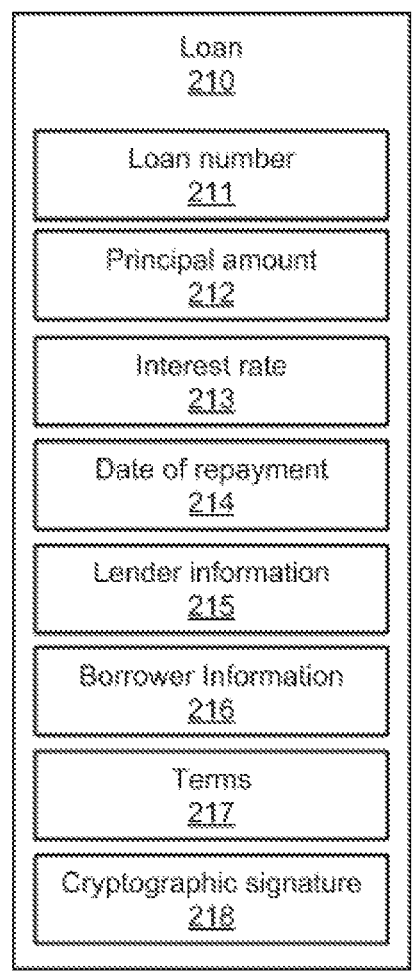
FIG. 8 illustrates an example loan record.

FIG. 8 illustrates an example loan record 210 (loan) corresponding to a document (i.e., information) evidencing a debt (e.g., contract, obligation, etc.) that places borrower 130 under restrictions, e.g., loan covenants or terms 217. In particular embodiments, loan record 210 corresponds to a debt instrument used in lending of the asset-backed digital currency by lender 140 to a recipient, i.e., borrower 130. Wherein, borrower 130 incurs a debt, and is liable to pay interest on that debt until it is repaid, and also to repay the principal amount borrowed. In particular embodiments, loan record 210 comprising loan number 211, principal amount 212 (loan principal, loan principal amount) of the asset-backed digital currency borrowed, interest rate 213 lender 140 is charging, date of repayment 214, lender information 215 relating to lender 140, borrower information 116 relating to borrower 130, and optionally cryptographic signature 218 (e.g., a digital signature, a digital fingerprint, or other means of authentication) for authenticating loan record 210. System 100 is not limited by any embodiment of loan record 210, as any other embodiments will find use with system 100.

Figure 9:
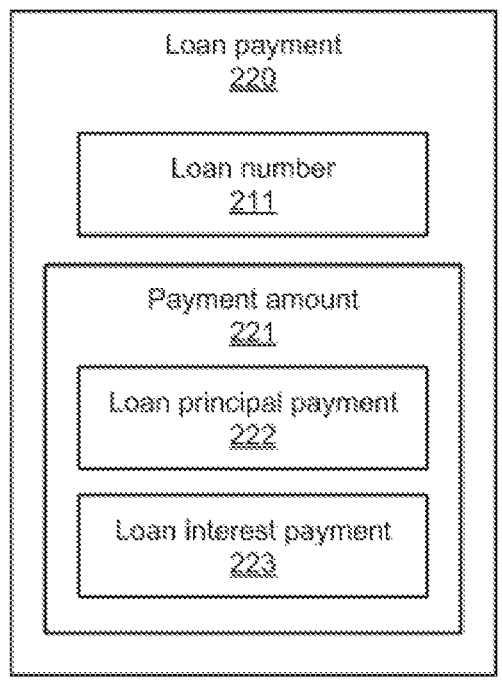
FIG. 9 illustrates an example loan payment record.

FIG. 9 illustrates an example loan payment record 220 comprising loan number 211, and payment amount 221 of the asset-backed digital currency, comprising loan principal payment 222, and loan interest payment 223. Wherein, payment amount 221 was provided by the borrower as part of loan payment record 220. System 100 is not limited by any embodiment of loan payment record 220 or any means for receiving, processing or transferring payment amount 221, as any other embodiments will find use with system 100.

Figure 10:
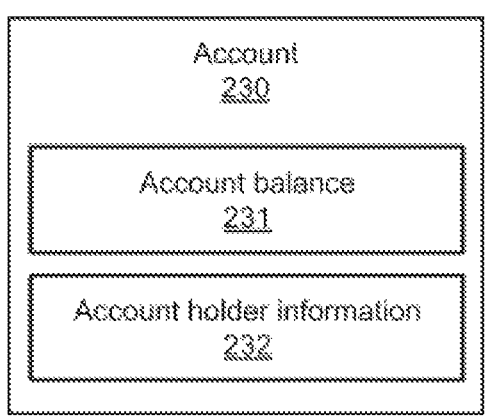
FIG. 10 illustrates an example account record.

FIG. 10 illustrates an example (optional) account 230 comprising account balance 231, and account holder information 232. Wherein, account balance 231 is at least operable to store an amount of the asset-backed digital currency, and may store other currencies including fiat currencies such as USD, Euro, Yen, etc., and cryptocurrencies. Wherein, account holder information 232 relates to account 230 owner, for example, an individual, a corporation, etc. and may correspond to borrower 130, payer account 160, payee account 170, etc. System 100 is not limited by any embodiment of account 230, as any other embodiments will find use with system 100.

Operation—FIG. 1, 1A, 2-10

In particular embodiments, cryptographic monetary system 100 employs cryptographic algorithms, including a cryptographic signature, to provide means for securing issuance of an amount of available balance 111 of an asset-backed digital currency, and means for verifying available balance 111 of the asset-backed digital currency issued by system 100. Wherein, the asset-backed digital currency is a digital security designed to work as a medium of exchange that uses strong cryptography to secure the creation of additional units. The asset-backed digital currency is a kind of monetary units (money, currency, digital currency, virtual currency or electronic money) used in system 100 as means for transacting goods and services.

In particular embodiments, system 100 provides for issuing loans such as loan record 210 for an amount of asset-backed digital currency. Wherein, asset-backed digital currency is a novel type of a security collateralized by loans of asset-backed digital currency, whereby asset-backed digital currency is also an asset usable as a monetary unit (i.e., currency). Wherein, system 100 is operable to store information corresponding to loan record 210 and loan payments 220 in ledger 700 implemented using blockchain 600 that is secured using private key 112 and verified using public key 113, for example, by third party 150 (e.g., general public). Whereby, providing a means for verifying that the available balance 111 of asset-backed digital currency in system 100 is substantially equal to the unpaid principal amount (or an outstanding debt) on loans stored in ledger 700. Whereby, system 100 provides the asset-backed digital currency for use as a monetary units backed by the full faith and credit of borrowers 130.

In particular embodiments, loan record 210 is the means for lending of assets such as asset-backed digital currency by lender 140 (i.e., an investor) corresponding to one or more individuals, organizations, and/or other entities to borrower 130 (i.e. an issuer or an issuing party) corresponding to other individuals, organizations etc. Loan record 210 is a debt instrument (obligation, contract, etc.) that enables borrower 130 to raise funds (i.e., asset-backed digital currency) by promising to repay a lender in accordance with terms 217 of loan record 210. Loan originator 110 provides a loan origination process by which borrower 130 applies for loan record 210, and lender 140 processes that application. Origination generally includes all the steps from taking a loan application up to disbursal of funds (or declining the application). In preferred embodiments, loan originator 110 is the same entity as lender 140. Loan servicing (loan maintenance) covers everything following loan 210 origination until loan 210 is fully paid off. Wherein, borrower 130 incurs a debt, and is usually liable to pay interest on that debt until it is repaid, in addition to the principal amount 212 borrowed. Loan record 210 evidencing the debt (e.g., loan, note, bond, debenture, certificate, mortgage, lease, letter of credit, etc.) is a document that normally includes information comprising principal amount 211 of money or securities (including the asset-backed digital currency described herein) borrowed, lender information 215, borrower information 216, terms 217 including an interest rate, a repayment date; and optional cryptographic signature 218 (e.g., a digital signature, a digital fingerprint, or other means of authentication) for authenticating loan record 210. In the case of lender 140, loan 210 is a financial asset (i.e., an asset that gets its value from a contractual right or ownership claim) having value of an outstanding portion of loan 210. Whereby system 100 is enabled to use loan 210 as a financial asset to collateralize issuance of principal amount 211 of asset-backed digital currency.

In particular embodiments, system 100 comprising: memory 304 operable to: store loan ledger 700 operable to store a plurality of data records in at least one blockchain 600 associated with cryptographic keys including private key 112, and public key 113, the plurality of data records comprising a number of loan records 210 and a number of loan payments records 220 associated with each loan record 210, wherein: each loan record 210 comprising loan number 211, principal amount 212 of an asset-backed digital currency, lender information 215 associated with lender 140, and borrower information 216 associated with borrower 130, optionally comprising information relating to account 230 comprising account balance 231 operable to store at least principal amount 212, each loan payment record 220 comprising loan number 211, and payment amount 221 of the asset-backed digital currency, comprising loan principal payment 222, and loan interest payment 223; store available balance 111 of the asset-backed digital currency; and processor 302 communicatively coupled to memory 304, memory 304 including executable instructions that upon execution by processor 302 cause system 100 to: receive authorization request 410 corresponding (e.g., via a loan number 211) to loan record 210, request 410 requesting to: store 420 loan record 210 in loan ledger 700; optionally increment 430 account balance 231 relating to account 230 by an amount comprising principal amount 212; and increment 440 available balance 111 by an amount corresponding to loan principal 212; receive payment request 510 comprising loan payment record 220 associated (e.g., via loan number 211) with loan record 210, request 510 requesting to: receive payment amount 520 corresponding to loan payment record 220; store loan payment record 220 in loan ledger 700; optionally decrement account balance 231 by an amount comprising loan principal payment 222; and decrement 530 available balance 111 by a portion of the payment amount 221 corresponding to loan principal payment 222. Whereby: system 100 provides available balance 111 of the asset-backed digital currency as monetary units; system 100 provides available balance 111 of the asset-backed digital currency having value comprising total value of loans stored in the loan ledger 700; system 100 provides the asset-backed digital currency having a substantially stable value; system 100 enables to substantially verify that available balance 111 of the asset-backed digital currency is substantially equals sum of principal amount 212 of each loan 210 stored in loan ledger 700 minus sum of loan principal payments 222 of each loan payment stored in loan ledger 700, wherein data stored in loan ledger 700 could be validated using public key 113.

In certain embodiments, system 100 wherein the asset-backed digital currency is a monetary unit. In a further embodiment, system 100 wherein loan 210 is further comprising terms 217 agreed to by borrower 130, said terms comprising a smart contract. In a further embodiment, system 100 wherein loans 210 and loan payments 220 are stored on separate blockchains 600. In a further embodiment, system 100 wherein loans 210 stored on loan ledger 700 are accessible to a third party 150 using public key 113. In a further embodiment, system 100 wherein loan payments 220 stored on loan ledger 700 are accessible (and verifiable) to third party 150 using public key 113. In a further embodiment, system 100 enables to substantially verify that available balance 111 of the asset-backed digital currency is substantially equals sum of principal amount 212 of each loan stored in loan ledger 700 minus sum of loan principal payments 222 of each loan payment stored in loan ledger 700, wherein data stored in loan ledger 700 could be validated using public key 113. In a further embodiment, system 100 wherein lender 140 is third party 150 providing principal amount 212 of loan 210. In a further embodiment, system 100 wherein lender 140 is third party 150 providing guarantees for loan 210. In a further embodiment, system 100 wherein a portion of loan interest payment 223 is used to pay for the operation of system 100. In a further embodiment, system 100 wherein loan interest payment 223 substantially increases the value of the asset-backed digital currency.

In particular embodiments, system 100 provides for issuing loans 210 of the asset-backed digital currency, processing loan payments 220, and collecting loan interest payments 223 (denominated in the asset-backed digital currency) from these loans. In some embodiments, system 100 may use proceeds of loan interest payments 223 to pay for maintaining operation of system 100, including system 100, and transaction processor 190. Whereby, transaction processor 190 is able to provide transactions of the asset-backed digital currency between accounts (e.g., payer account 160 and payee account 170) at substantially reduced costs or free of transaction costs. Additionally, system 100 may provide payment instruments, such as debit cards, payment apps, etc., to perform said transactions using transaction processor 190.

In particular embodiments, transaction processor 190 is further enabled by currency exchange 180 to convert funds being transacted (or transferred), for example, from payer account 160 in to currency acceptable to payee account 170. Wherein, currency exchange 180 enables conversion (via trade) of the asset-backed digital currency to other currencies including fiat currencies such as USD, Euro, Yen, etc., and cryptocurrencies. Whereby, system 100 enables payer account 160 to make payments (e.g., relating to goods and services) to payee account 170 in a currency including the asset-backed digital currency, fiat currencies (such as USD, Euro, Yen, etc.), cryptocurrencies, and other securities.

The invention claimed is:

1. A system comprising:
   a. a memory operable to:
      i. store a loan ledger operable to store a plurality of data records in at least one blockchain associated with cryptographic keys including a private key, and a public key, the plurality of data records comprising a number of loan records and a number of loan payments records associated with each loan record, wherein:
         1). each loan record comprising a loan number, a principal amount of an asset-backed digital currency, a lender information associated with a lender, and a borrower information associated with a borrower, and
         2). each loan payment record comprising the loan number, and a payment amount of the asset-backed digital currency, comprising a loan principal payment, and a loan interest payment;
      ii. store an available balance of the asset-backed digital currency;
   b. and a processor communicatively coupled to the memory, the memory including executable instructions that upon execution by the processor cause the system to:
      i. receive an authorization request corresponding to a loan record, the request requesting to:
         1). store the loan record in the loan ledger; and
         2). increment the available balance by an amount corresponding to the principal amount;
      ii. receive a payment request comprising a loan payment record associated with the loan record, the request requesting to:
         1). store the loan payment record in the loan ledger; and
         2). decrement the available balance by a portion of the payment amount corresponding to the loan principal payment;
   whereby:
      (a) the system provides the available balance of the asset-backed digital currency as monetary units;
      (b) the system provides the available balance of the asset-backed digital currency having value comprising a total value of loans stored in the loan ledger;
      (c) the system provides the asset-backed digital currency having a stable value;
      (d) the system enables to substantially verify that the available balance of the asset-backed digital currency is equals a sum of the principal amount of each loan stored in the loan ledger minus a sum of the loan principal payments of each loan payment stored in the loan ledger, wherein data stored in the loan ledger could be validated using the public key.

2. The system of claim 1, wherein the asset-backed digital currency is a monetary unit.

3. The system of claim 1, wherein the loan is further comprising terms agreed to by the borrower, said terms comprising a smart contract.

4. The system of claim 1, wherein the loan records and the loan payment records are stored on separate blockchains.

5. The system of claim 1, wherein the loan records stored on the loan ledger are verifiable by a third party using the public key.

6. The system of claim 1, wherein the loan payment records stored on the loan ledger are verifiable by a third party using the public key.

7. The system of claim 1, wherein the system enables to substantially verify that the available balance of the asset-backed digital currency is equals a sum of the principal amount of each loan stored in the loan ledger minus a sum of the loan principal payments of each loan payment stored in the loan ledger, wherein data stored in the loan ledger could be validated using the public key.

8. The system of claim 1, wherein the lender is a third party providing the principal amount of the loan.

9. The system of claim 1, wherein the lender is a third party providing guarantees for the loan.

10. The system of claim 1, wherein a portion of each loan interest payment is used to pay for maintaining operation of the system.

11. The system of claim 1, wherein the loan interest payment substantially increases a value of the asset-backed digital currency.

* * * * *